(12) United States Patent
Gupta et al.

(10) Patent No.: US 11,886,849 B2
(45) Date of Patent: Jan. 30, 2024

(54) SYSTEM AND METHOD TO COMPARE MODULES FOR THE COMMON CODE, REMOVE THE REDUNDANCY AND RUN THE UNIQUE WORKFLOWS

(71) Applicant: Dell Products L.P., Round Rock, TX (US)

(72) Inventors: Veenu Gupta, Milpitas, CA (US); Abhilash Mukesh, Santa Clara, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 17/648,516

(22) Filed: Jan. 20, 2022

(65) Prior Publication Data
US 2023/0229408 A1 Jul. 20, 2023

(51) Int. Cl.
*G06F 8/41* (2018.01)

(52) U.S. Cl.
CPC ............ *G06F 8/4435* (2013.01); *G06F 8/427* (2013.01)

(58) Field of Classification Search
None
See application file for complete search history.

(56) References Cited

U.S. PATENT DOCUMENTS

| | | | | |
|---|---|---|---|---|
| 4,543,957 A | * | 10/1985 | Friedman | A61B 5/377 600/300 |
| 8,498,987 B1 | * | 7/2013 | Zhou | G06F 16/901 707/741 |
| 11,321,226 B2 | * | 5/2022 | Felisatti | G06F 40/20 |
| 11,514,171 B2 | * | 11/2022 | Dinh | G06N 5/022 |
| 2012/0131566 A1 | * | 5/2012 | Morgan | G06F 8/65 717/170 |
| 2015/0081646 A1 | * | 3/2015 | Jin | G06F 11/3003 707/686 |
| 2015/0248288 A1 | * | 9/2015 | Murphy | G06F 8/447 717/121 |
| 2015/0331687 A1 | * | 11/2015 | Groover | G06F 9/44536 717/168 |
| 2016/0188325 A1 | * | 6/2016 | Blitzstein | H04L 65/403 717/101 |
| 2017/0192777 A1 | * | 7/2017 | Apte | G06F 8/76 |
| 2020/0218535 A1 | * | 7/2020 | Alomari | G06F 8/425 |
| 2021/0182037 A1 | * | 6/2021 | Hu | G06F 8/427 |

* cited by examiner

*Primary Examiner* — Marina Lee
(74) *Attorney, Agent, or Firm* — Workman Nydegger (57) ABSTRACT

One example method includes receiving a code request, parsing code associated with the code request, storing, in a staging database, a portion of the code, traversing a codebase to identify any code in the codebase that matches the portion of the code, and when code is found in the codebase that matches the portion of the code, incrementing a green count and pushing the portion of the code to a redundant code bin, and when no code is found in the codebase that matches the portion of the code, incrementing a red counter and updating the codebase to include the portion of the code.

20 Claims, 4 Drawing Sheets

```
Initiate Parser Algorithm
Input all coding styles
Update Conf_file with required inputs
for requirements in Conf_file:
    Update the Staging_DB
    if Staging_DB.module == Master_DB.module
        Green_counter++
        Update Redundant_code_bin
        Run GC
    else if Staging_DB.Pattern == Master_DB.Pattern
        Yellow_counter ++
        Update Redundant_code_bin
        Run GC
    else if Staging_DB.Functions == Master_DB.Functions
        Yellow_counter ++
        Update Redundant_code_bin
        Run GC
    else
        Red_counter ++
        Insert new Records on Master_DB
Output Unique_Regression_Test_code
```

SYSTEM AND METHOD TO COMPARE MODULES FOR THE COMMON CODE, REMOVE THE REDUNDANCY AND RUN THE UNIQUE WORKFLOWS

FIELD OF THE INVENTION

Embodiments of the present invention generally relate to code development. More particularly, at least some embodiments of the invention relate to systems, hardware, software, computer-readable media, and methods for reducing, or avoiding, code redundancy in a development environment.

BACKGROUND

Code redundancy, that is, the development of code that, unbeknownst to the developer, has already been created, is a significant problem in the IT (information technology) industry. For example, code redundancy increases the number of lines of code in a product, making it difficult for an engineer to keep track of the code, as well as increasing the time and effort put in to write the same piece of code that has already been checked in previously. That is, development of redundant code wastes time and resources that could be better employed in other efforts.

Moreover, there is no way to track modules or definitions used in a codebase. As a result, any new developer or a test automation engineer hired typically assumes that any feature or test case assigned is new, and that engineer will then write the whole code from scratch without looking into what code or modules may have already been developed.

Finally, in the IT industry, developers are under pressure to produce deliverables. As a result, they may not have time to explain the entire codebase to any incoming developer or other new personnel, such that the new employee, or a person new to a particular software project, is made aware of the code and modules already present in the codebase. These examples thus indicate that it is possible that a developer will not be aware of all the code, and implementations, that may be present in the codebase of an enterprise.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to code development. More particularly, at least some embodiments of the invention relate to systems, hardware, software, computer-readable media, and methods for reducing, or avoiding, code redundancy in a development environment.

In general, example embodiments of the invention may enable the identification of redundant, or possibly redundant, code and thereby improve the speed and efficiency of development processes by reducing, or eliminating, development of redundant code.

Some particular embodiments may operate to traverse a codebase and watch for new code inflow. While watching the new code writes/edits, embodiments may collect various modules, functions, definitions, code patterns and the path to find it, and may populates the codebase with all the information collected. When a new code writing software project comes in, and the programmer or developer on the software project wants to know how much of the code needed for the software project is already present in the codebase, the programmer may provide a few keywords about the feature that needs to be implemented in the program that the programmer is creating. Embodiments of the invention may then take this input provided by the programmer and check through the codebase to see if there is a hit, indicating that code to implement the feature identified by the programmer has already been developed. If there is a hit, the programmer may implement the already-developed code into the software project, and if there is no hit, the programmer may generate any new code needed and then add the new code to the codebase for use by others.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one an embodiment may reduce, or eliminate, the development of redundant code in a development environment. An embodiment may improve the efficiency and effectiveness of code development processes, relative to how those code development processes would be performed absent the functionalities of one or more of the example embodiments. An embodiment may slow the growth of a codebase by reducing, or eliminating, the development of redundant code that would otherwise be stored in the codebase. An embodiment may enable more efficient use of developer time since the developer may not be expending effort on development of redundant code. Various other advantages of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of Some Example Embodiments

Figure 1:
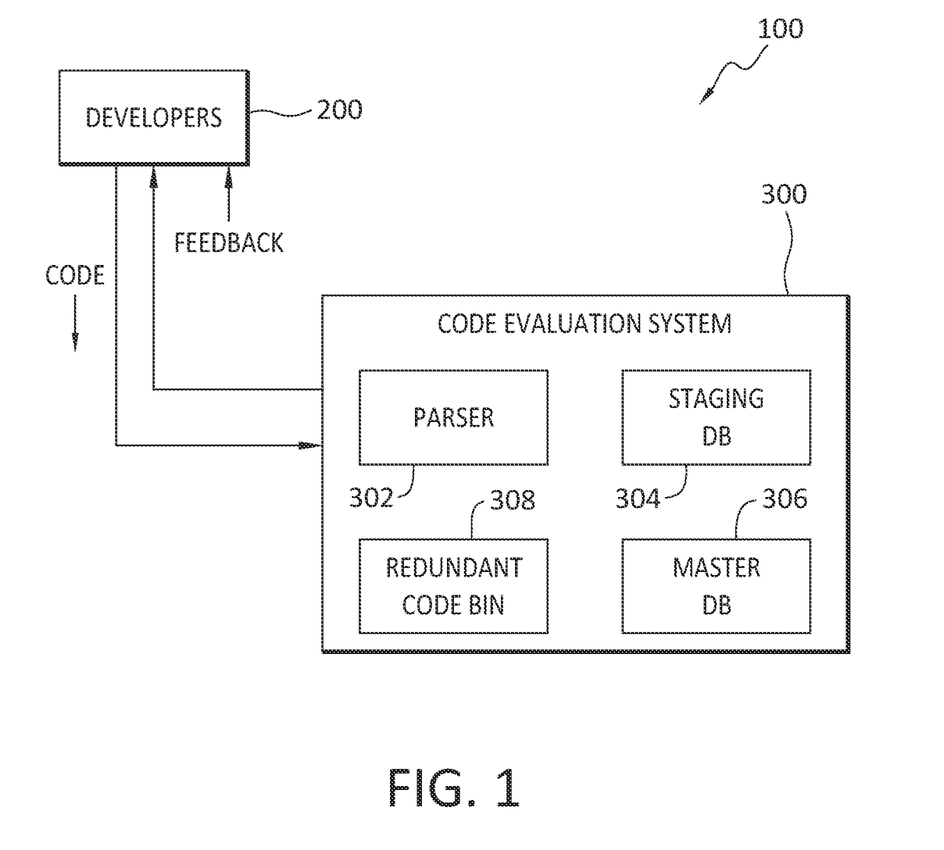
FIG. 1 discloses aspects of an example system according to some embodiments of the invention.

With reference first to FIG. 1, details are provided concerning an example configuration 100 according to some embodiments of the invention. In general, the configuration 100 may comprise one or more developer platforms 200 by way of which a developer may generate code that may then be transmitted to a code evaluation system 300. The developer platforms 200 may be developer clients hosted on respective individual devices, and a developer application may be provided that is hosted, for example, on a server accessible by the developer clients on the developer platforms 200. Alternatively, each of the developer platforms 200 may comprise a standalone developer application by way of which a developer may generate code, and transmit that code to the code system 300. Note that, regardless of the form of their implementation, the various developer platforms 200 may, or may not, each involve the use of the same coding language.

In general, and as shown in FIG. 1, a developer may upload, or otherwise provide, code to the code evaluation system 300. The code evaluation system 300 may, as discussed in more detail below, evaluate the uploaded code and, among other things, provided feedback to the developer concerning the code submitted by the developer. To this end, the example code evaluation system 300 may include, but is not limited to, a parser 302, staging DB (database) 304, master DB 306, and redundant code bin 308, along with various counters (not shown).

Figure 2:
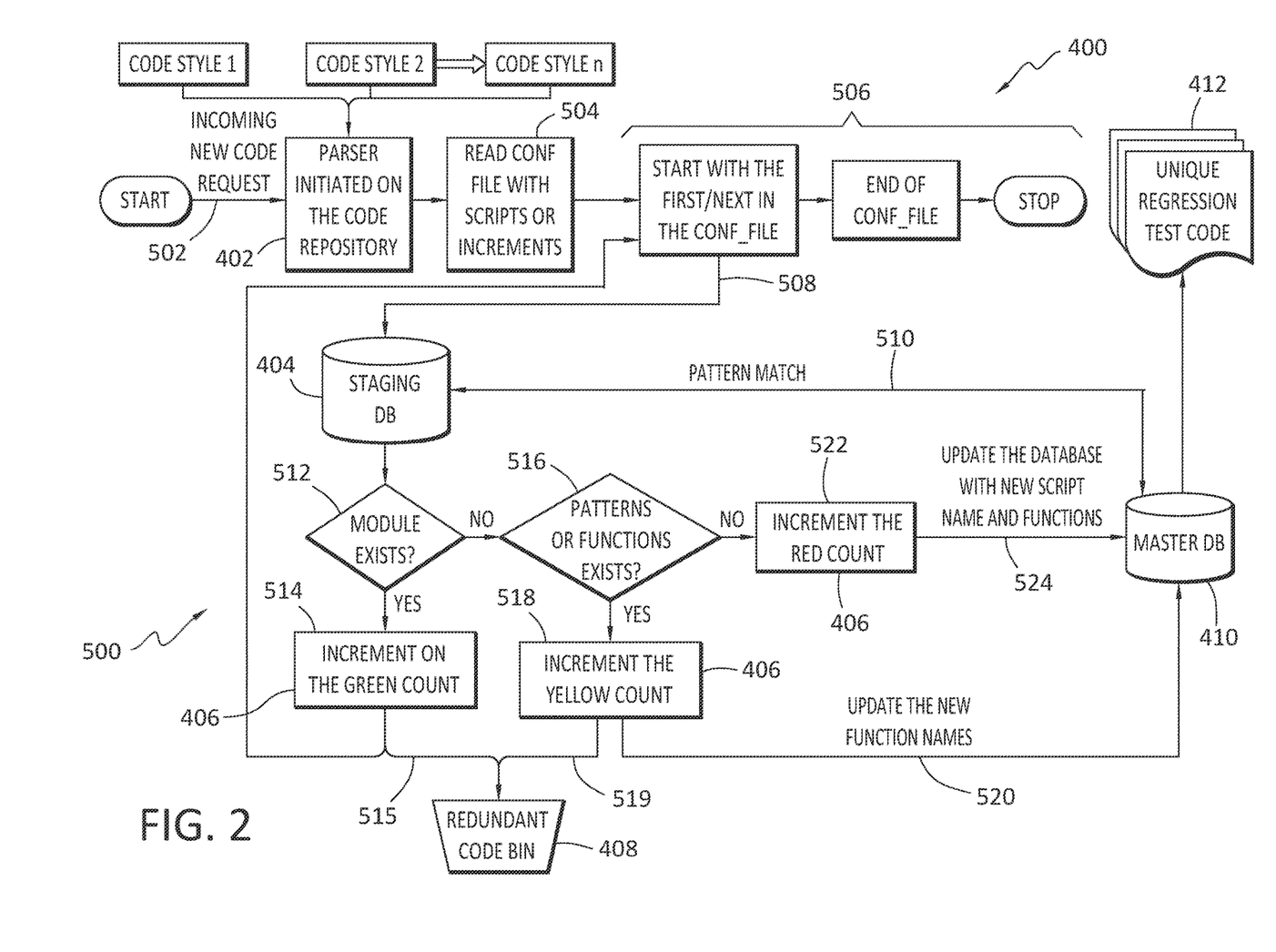
FIG. 2 discloses aspects of an example system and method according to some embodiments.

Turning next to FIG. 2, aspects of a code evaluation system 400, and code evaluation method 500, according to some example embodiments, are disclosed. In general, the method 500 may operate in connection with various components of the code evaluation system 400 including, but not limited to, a parser 402, staging DB 404, counters 406, redundant code bin 408, and master DB 410 which comprises, or consists of, a codebase. Briefly, example embodiments of the invention are operable to traverse a codebase and watch for new code inflow. While watching the new code writes/edits, embodiments may collect various modules, functions, definitions, code patterns and the path to find it, and populate a database, such as a master database, with all the information collected.

The example method 500 may begin when the parser 402, which may be initiated on the code repository, or codebase, receives 502 an incoming code request, that is, incoming code generated by a developer and which is submitted by the developer to the code evaluation system 400 for evaluation, including the possible identification of any redundant code in the incoming code request that was received 502. As part of the incoming code request 502, which may be generated by the developer, the developer may submit keywords and/or other data/metadata about a feature, for example, that the developer wants to implement as part of the code. This approach may be taken by a developer who would like to know how much of the submitted code is already present in the codebase.

To use a simple example, a developer whose code is concerned with summing a group of numbers, may submit, as part of the incoming code request 502, the keywords 'sum,' 'sum numbers,' or 'function(sum).' The keywords and/or other data/metadata may be selected by the developer based upon the particular programming language and syntax used by the developer. For example, a 'sum' function may be expressed differently in C++ than in Java, or in html.

After receipt of the code, the code evaluation system 400 may then read 504 through the code, and/or through a configuration file (config file) associated with the code, using one or more scripts or other mechanisms. The code and/or config file may continue 506 to be read until the end of the code or config file is reached. In more detail, the example code evaluation system 400 may read 504 all the requirements, pseudo-code, or keywords of the feature to be implemented. The code evaluation system 400 may be configured to comprehend different coding styles, and languages, as well during the reading 504 process. An example would be some coders may use python coding language and might have used 'print ( ).' In contrast, other developers may use a shell script and may use echo or C language to use 'printf ( ).' The parser 402 may be configured to be able to recognize a wide variety of coding styles and languages.

As the parser 402 reads 504-506 through the code that was received from the developer, the parser 402 may pass 508 the code to the staging DB 404. The code may be passed 508 in any suitable manner. For example, if the parser 402 recognizes that a portion of code comprises a module, that module may be passed 508 to the staging DB 404. Thus, it is not required that all of the incoming code be passed to the staging DB 404 at one time. Rather, and as noted, the parser 402 may progressively walk the received code and pass 508 that code, possibly in one or more portions, to the staging DB 404 according, for example, to the way that the code is structured and organized.

After code has been stored 508 in the staging DB 404, the code evaluation system 400 may perform a check 510 to determine, for example, whether or not a module that is included in the code received 502 in the incoming code request already exists in the codebase, or master DB 410. To perform the check 510, which may then enable a determination 512 as to whether or not a module exists in the master DB 410, the code evaluation system may employ, for example, a so-called 'brute force' (BF) algorithm. One example of a BF algorithm is a brute force search, or exhaustive search, which may comprise, for example, a problem-solving technique and algorithmic paradigm that entails systematically enumerating all possible solutions and evaluating whether each solution satisfies a problem statement. While other approaches may be more computationally efficient than a BFA, a BFA search may be able to read every module, code pattern, code string, and all permutations of these, in the code base, definitions, paths, and populate the master DB 410 when required. Thus, in one example implementation, performance of the check 510 may involve the use of a BF search algorithm that compares a module in the staging DB 404 with every module that is contained in the master DB 410, in order to identify any possible matches. A match between algorithms, or other code portions, may be referred to herein as a 'pattern match' since the algorithms being compared may, or may not, share one or more code patterns.

After a comparison of modules, for example, has been performed, a determination 512 may then be made as to whether the received module matches a module in the codebase. Depending upon the outcome of the determination 512, a corresponding counter may be incremented 514. For example, if the determination 512 reveals that the received module already exists in the codebase, a 'green' count may be incremented, indicating that at least this particular module, or portion, of the received code has already been implemented.

If the determination 512 is made that the incoming module does not match any modules in the codebase, a further check 516 may be performed to determine, nonetheless, whether there is a pattern, definition, or function, for example, within the module, already exists. If so, a 'yellow' count may be incremented 518 indicating that the pattern or function is new, such that a module in the codebase that, except for the new function, may otherwise match the module with the new function, should be updated with the code modifications necessary to ensure a match between the stored module and the incoming module.

Note that when either the 'green' or 'yellow' count is incremented at 514 or 518, respectively, the code evaluation system may push 515 all the redundant code into the redundant code bin 408 for inspection and disposition purposes, or may push 519 all the redundant functions into the redundant code bin 408. Further, when a module in the codebase requires updating, based upon discovery of a new function for example, in the received code, the module in the codebase may be updated 520 to include the new function, and the name of the new function.

At 516, if it is determined that, for example, the pattern(s) and function(s) in the received module do not exist in the codebase, that is, no portion of the received module exists in the codebase, the 'red' count may be incremented 522. That is, the parser 402 has recognized that the module comprises, for example, a new feature, and adds 524 the module, the definition used, and the path as a new entry onto the master DB 410. Note that after all of the code identified in an incoming new code request 502 has been processed by the parser 402, all of the counts may be reset to zero. Finally, in some embodiments, regression testing may be performed to validate the code stored, or to be stored, in the master DB 410. The regression testing may result in the generation of unique regression test codes 412 for the respective portions of code that have been test, and the regression test codes 412 may indicate the outcome of the testing process, such as by indicating whether or not a test was passed or failed by a portion of code.

Figure 3:
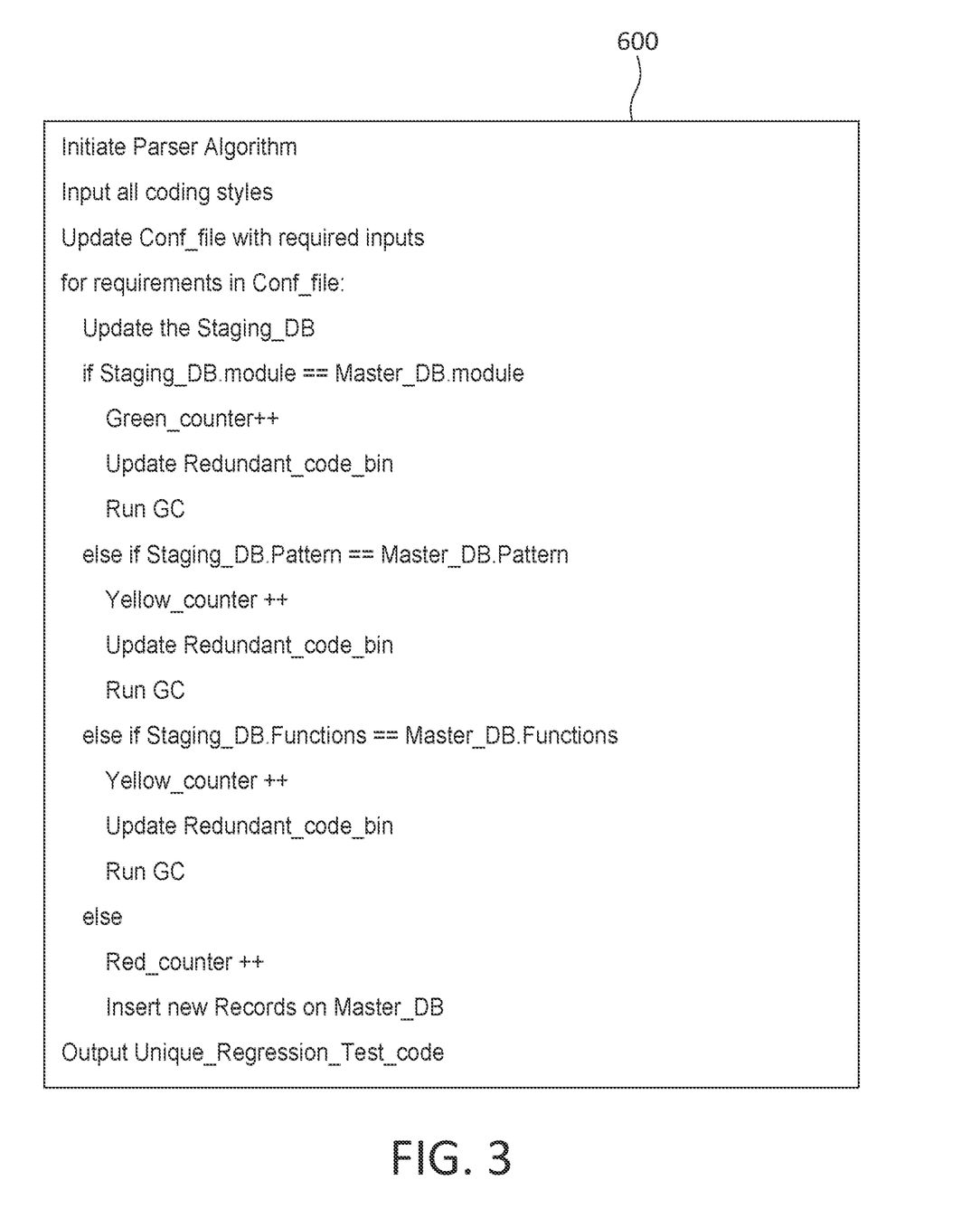
FIG. 3 discloses an example algorithm and pseudocode according to some embodiments.

With reference briefly to FIG. 3, example pseudocode 600 is disclosed. In general, the pseudocode 600 embodies an algorithm that may be run by the parser 402 to identify redundant code, if any, that is included in the incoming new code request 502. Note that the relative counts of each of the counters may, when considered collectively, indicate how much code of a module is new, partly new, or already exists. Note that in FIG. 3, 'GC' refers to a garbage collection process that may be run periodically, or on some other basis, on the redundant code bin to reclaim space used by any redundant code that may be present in the redundant code bin, and/or that may be present elsewhere in the system.

B. Aspects of Some Example Code Redundancy Checks

As noted, example embodiments may be operable to find redundant code. Various approaches may be employed in this regard. The following examples are illustrative, but are not intended to limit the scope of the invention in any way.

B.1 Example 1

| Original Code Fragment | Code Fragment 1 | Code Fragment 2 | Code Fragment 3 | Code Fragment 4 |
|---|---|---|---|---|
| if(a==b) { C = a+b; } C = a-b; | if (a==b) { //comment 1 C = a + b } else //comment2 C= a-b; | if (g==f) { //comment1 h=g+f; } else //comment 2 h=g-f; | if (a==b) { //comment1 c=a+b; // New Stat. b=a-c; } else //comment2 c=a/b; | switch(true) { //comment1 case a==b: c=a+b; //comment2 case a!=b: c=a-b; } |
| Type 1 | Type 2 | Type 3 | Type 4 | |

The foregoing are examples of code fragments such as may be processed by example embodiments of the invention. If, for example, there is a definition to add to variables, the users might use different coding styles, as shown immediately below. For example, all of the code fragments shown immediately below are directed to a summing process involving 3 variables, but the code fragments are all expressed differently, and may include other content, such as a 'comment' for example, that may not be relevant for parsing purposes.

| int a, b, c; | int p, q, r; | int z, p, n; |
|---|---|---|
| a = b + c; | //comment 1 | z = p + n; |
| | p = q + r; | //comment 2 |

Given input such as that indicated immediately above, example embodiments, such as of a parser, may read the all the different coding styles and perform some preprocessing to remove all the comments and any redundant code and places it on to the staging DB. The result of one example of such preprocessing is shown immediately below.

| int a, b, c; | int p, q, r; | int z, p, n; |
|---|---|---|
| a = b + c; | p = q + r; | z = p + n; |

Once the preprocessing has been completed, and any redundancies removed, example embodiments may then operate to normalize the code, and then compare the normalized code to code in the backup DB to determine whether or not there is a match. Normalization of the code immediately above results in the normalized code immediately below.

| | | |
|---|---|---|
| int id1, id2, id3; | int id1, id2, id3; | int id1, id2, id3; |
| id1 = id2 + id3; | id1 = id2 + id3; | id1 = id2 + id3; |

From this normalized code (immediately above), example embodiments may determine that all the users are trying to perform the same operation, that is, a sum of 2 numbers in this case, and may update the green, yellow, and red, counters accordingly. In some example embodiments, the staging DB may also store, such as in a cache for example, some frequently used coding styles, which may vary from one coding language to another. If a particular code style is detected in the staging DB, and is known not to exist in the codebase, an embodiment may automatically update the counter accordingly without the requirement to contact the backup DB, since it is already known that the code style is not present in the codebase. Where the code style of an incoming code request is known, some embodiments may contact the backup DB to determine if there is redundant code, since the fact that the code style is known at least suggests that the codebase includes code of that style. This approach may reduce the amount of time needed by the parser to identify redundant code.

B.2 Example 2

Following is another example embodiment involving a code redundancy check. In this example. In this example, an algorithm according to some embodiments may find out the hash id per pattern (single/multiple lines of code together) in the code. This hash value of the user code may then be compared with the hash values, possibly all the hash values, in a database such as the staging database, and if there is a match, then the green counter will be updated accordingly to indicate that the hashed code already exists in the codebase. On the other hand, if there is no match in the database with the given hash value, the new hash value will be updated to the database, and the yellow and red counter will be updated accordingly. The following example is illustrative.

This particular example considers a definition or a module as one block and may then operate to compare the hash of each block with one or more hashes in a database, such as a staging database.

| | | |
|---|---|---|
| Def (int a, b,c) – > (block1) | Def(int p,q,r) ->(block2) | Def(int z,p,n)->(block3) |
| int a, b, c; | int p, q, r; | int z, p, n; |
| a = b + c; | P = q + r; | z = p + n; |

The code immediately above may be normalized to produce the normalized code immediately below.

| | | |
|---|---|---|
| int id1, id2, id3; | int id1, id2, id3; | int id1, id2, id3; |
| id1 = id2 + id3; | id1 = id2 + id3; | id1 = id2 + id3; |

Each code block 'id1=id2+id3,' 'id1=id2+id3,' and 'id1=id2+id3' of the normalized code may then be hashed using a hashing function. In this example, the hashing process produces the hash values below. Because all 3 strings of normalized code are the same, their respective hashes are the same as well, as shown below. The, an algorithm according to some embodiments may compare each hash value with the hash values in the database, and increment the green counter for each match found.

```
Block1 hash: 100
Block2 hash: 100
Block3 hash: 100
```

C. Some Example Further Aspects of Some Embodiments

It is noted that while embodiments of the invention may identify code coverage, that is, whether or not code to perform a particular function exists in a codebase, the scope of the invention is not so limited. For example, and as discussed herein, embodiments of the invention may identify common, or redundant code, and may help to reduce the cost associated with maintaining code by eliminating redundant code.

Further, the BF algorithms that may be used in some embodiments may, in some cases, miss a particular pattern or combination when searching the codebase. If this were to occur, embodiments may retain those patterns in the staging DB for additional unit tests.

As well, there may be some conventional approaches to finding redundant code. However, those tools typically have high numbers of false positives. Because example embodiments of the invention may use a BF approach, the number of false positives may be quite small, or even zero in some cases. Further, use of the BF approach may help to ensure that the codebase is fully up to date with all the relevant, and current, information. Further, embodiments may be robust in the sense that they may be implemented, for example, as a plugin and are not constrained for use with any particular code language. Rather, embodiments may be implemented in circumstances where multiple different languages are employed by one or more developers.

Moreover, embodiments may be employed with a variety of different programming software, and may be cycled repeatedly, enabling continuous integration of new code in the code base. For example, some embodiments may update a codebase as soon as there a new code check-in, and may update all the code parameters onto the database. This functionality may be enabled by a brute force approach that reads all the functions from beginning to end for every code check-in. The time to update for this tool after the first read may be significantly less when compared to conventional tools, and setup time for conventional tools may be significantly longer than for some example embodiments. Moreover, check rules used by a parser may be strict. For example, one rule may state 'too many parameters to take off,' that is, too many code parameters to check. Thus, example embodiments may employ a separate staging DB which may be used to compare all the permutations and combinations before taking a call to update the codebase.

As well, embodiments may operate to parse code as the code is created, that is, on-the-fly, rather than waiting until an entire module, for example, is created, and then parsing the module code. The developer may receive reports from the code evaluation system 400 as any new code written by that developer is committed to the master DB. In this way, the developer may be apprised as to which code may not need to be written again. The reports from the code evaluation system 400 may be entered into a developer-accessible log.

Further, it will be apparent from this disclosure that example embodiments may help to reduce software test code redundancy significantly, thereby also reducing the code maintenance cost over a period of time. Embodiments may also solve the common problem engineering teams have to deal with varied coding styles and maintaining code following common practices that are time consuming and expensive. Finally, embodiments may solve code redundancy challenges that have been one of the significant problems in the IT industry. As noted herein, code redundancy increases the lines of code, making it difficult for an developer to keep track of it, increases the time and effort put in to write the same piece of code that has already been checked in previously. At present, no system or parser available today is able to walk through the code to find redundancies using design patterns, code workflows, highlight the commonalities, and add color coded weighting that depicts the maintenance cost.

D. Example Methods

It is noted with respect to the example method of FIG. 2 that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

E. Further Example Embodiments

Following are some further example embodiments of the invention. These are presented only by way of example and are not intended to limit the scope of the invention in any way.

Embodiment 1. A method, comprising: receiving a code request; parsing code associated with the code request; storing, in a staging database, a portion of the code; traversing a codebase to identify any code in the codebase that matches the portion of the code; and when code is found in the codebase that matches the portion of the code, incrementing a green count and pushing the portion of the code to a redundant code bin, and when no code is found in the codebase that matches the portion of the code, incrementing a red counter and updating the codebase to include the portion of the code.

Embodiment 2. The method as recited in embodiment 1, further comprising, after the parsing and before the storing, performing preprocessing on the portion of the code.

Embodiment 3. The method as recited in embodiment 2, wherein the preprocessing comprises removing comments and/or redundant code from the code portion.

Embodiment 4. The method as recited in any of embodiments 1-3, further comprising, before the storing of the portion of code in the staging database, normalizing the portion of code.

Embodiment 5. The method as recited in any of embodiments 1-4, wherein the parsing is performed by a parser that is agnostic as to a programming language and/or programming style used to create the portion of the code.

Embodiment 6. The method as recited in any of embodiments 1-5, wherein updating the codebase to include the portion of the code further comprises updating the codebase to include a path to the portion of the code, and to include a definition of a function implemented by the portion of the code.

Embodiment 7. The method as recited in any of embodiments 1-6, wherein traversing the codebase comprises using a brute force search to traverse the codebase.

Embodiment 8. The method as recited in any of embodiments 1-7, wherein the portion of code comprises a string and/or a module.

Embodiment 9. The method as recited in any of embodiments 1-8, wherein traversing a codebase to identify any code in the codebase that matches the more hashes in the codebase.

Embodiment 10. The method as recited in any of embodiments 1-9, wherein when code is found in the codebase that matches only part of the portion of the code, incrementing a yellow count and pushing the part of the portion of the code that matches code in the codebase to a redundant code bin, and pushing a new part of the portion of the code to the codebase.

Embodiment 11. A system, comprising hardware and/or software, for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
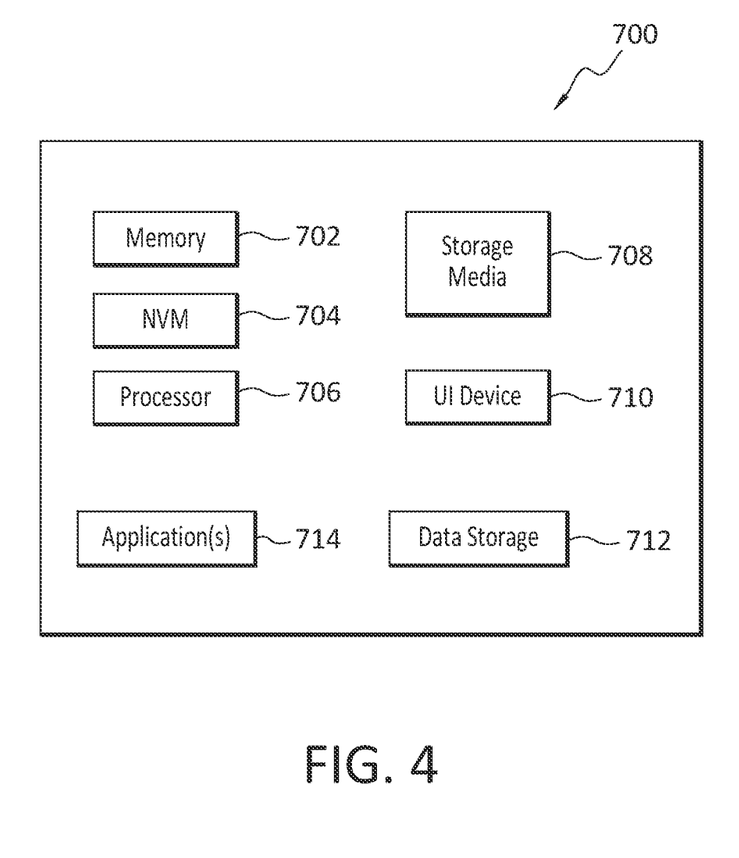
FIG. 4 discloses an example computing entity, comprising hardware and/or software, operable to perform any of the claimed methods, processes, and operations.

With reference briefly now to FIG. 4, any one or more of the entities disclosed, or implied, by FIGS. 1-3 and/or elsewhere herein, may take the form of, or include, or be implemented on, or hosted by, a physical computing device, one example of which is denoted at 700. As well, where any of the aforementioned elements comprise or consist of a virtual machine (VM), that VM may constitute a virtualization of any combination of the physical components disclosed in FIG. 4.

In the example of FIG. 4, the physical computing device 700 includes a memory 702 which may include one, some, or all, of random access memory (RAM), non-volatile memory (NVM) 704 such as NVRAM for example, read-only memory (ROM), and persistent memory, one or more hardware processors 706, non-transitory storage media 708, UI device 710, and data storage 712. One or more of the memory components 702 of the physical computing device 700 may take the form of solid state device (SSD) storage. As well, one or more applications 714 may be provided that comprise instructions executable by one or more hardware processors 706 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   receiving a code request;
   parsing code associated with the code request;
   performing preprocessing on the parsed code, wherein the pre-processing removes comments from the parsed code;
   normalizing a portion of the parsed code;
   storing, in a staging database, the portion;
   traversing a codebase to identify any code in the codebase that matches the portion; and
   when code is found in the codebase that matches the portion, incrementing a green count and pushing the portion to a redundant code bin, and when no code is found in the codebase that matches the portion, incrementing a red counter and updating the codebase to include the portion.

2. The method as recited in claim 1, further comprising, performing a regression test on the portion in the updated codebase to validate the code stored in the updated codebase.

3. The method as recited in claim 1, wherein the preprocessing further comprises removing redundant code from the parsed code.

4. The method as recited in claim 1, wherein normalizing the portion occurs before the storing of the portion in the staging database.

5. The method as recited in claim 1, wherein the parsing is performed by a parser that is agnostic as to a programming language and/or programming style used to create the portion.

6. The method as recited in claim 1, wherein updating the codebase to include the portion further comprises updating the codebase to include a path to the portion of and to include a definition of a function implemented by the portion.

7. The method as recited in claim 1, wherein traversing the codebase comprises using a brute force search to traverse the codebase.

8. The method as recited in claim 1, wherein the portion comprises a string and/or a module.

9. The method as recited in claim 1, wherein traversing a codebase to identify any code in the codebase that matches the portion comprises comparing a hash of the portion with one or more hashes in the codebase.

10. The method as recited in claim 1, wherein when code is found in the codebase that matches only part of the portion, incrementing a yellow count and pushing the part of the portion that matches code in the codebase to the redundant code bin, and pushing a new part of the portion to the codebase.

11. A non-transitory storage medium having stored therein instructions that are executable by one or more hardware processors to perform operations comprising:
   receiving a code request;
   parsing code associated with the code request;
   performing preprocessing on the parsed code, wherein the pre-processing removes comments from the parsed code;
   normalizing a portion of the parsed code;
   storing, in a staging database, the portion;
   traversing a codebase to identify any code in the codebase that matches the portion; and
   when code is found in the codebase that matches the portion, incrementing a green count and pushing the portion to a redundant code bin, and when no code is found in the codebase that matches the portion, incrementing a red counter and updating the codebase to include the portion.

12. The non-transitory storage medium as recited in claim 11, wherein the operations further comprise, performing a regression test on the portion in the updated codebase to validate the code stored in the updated codebase.

13. The non-transitory storage medium as recited in claim 11, wherein the preprocessing further comprises removing redundant code from the parsed code.

14. The non-transitory storage medium as recited in claim 11, wherein normalizing the portion occurs before the storing of the portion in the staging database.

15. The non-transitory storage medium as recited in claim 11, wherein the parsing is performed by a parser that is agnostic as to a programming language and/or programming style used to create the portion.

16. The non-transitory storage medium as recited in claim 11, wherein updating the codebase to include the portion further comprises updating the codebase to include a path to the portion, and to include a definition of a function implemented by the portion.

17. The non-transitory storage medium as recited in claim 11, wherein traversing the codebase comprises using a brute force search to traverse the codebase.

18. The non-transitory storage medium as recited in claim 11, wherein the portion comprises a string and/or a module.

19. The non-transitory storage medium as recited in claim 11, wherein traversing a codebase to identify any code in the codebase that matches the portion comprises comparing a hash of the portion with one or more hashes in the codebase.

20. The non-transitory storage medium as recited in claim 11, wherein when code is found in the codebase that matches only part of the portion, incrementing a yellow count and pushing the part of the portion that matches code in the codebase to the redundant code bin, and pushing a new part of the portion to the codebase.

* * * * *